United States Patent [19]

Penz

[11] Patent Number: 4,523,812
[45] Date of Patent: Jun. 18, 1985

[54] PLASTIC LIQUID CRYSTAL DEVICES WITH UNEQUAL SUBSTRATE THICKNESSES

[75] Inventor: Perry A. Penz, Richardson, Tex.

[73] Assignee: Texas Instruments Incorporated, Dallas, Tex.

[21] Appl. No.: 444,264

[22] Filed: Nov. 23, 1982

[51] Int. Cl.³ .............................................. G02F 1/13
[52] U.S. Cl. ................................ 350/334; 350/339 R
[58] Field of Search ........................... 350/339 R, 334

[56] References Cited

U.S. PATENT DOCUMENTS 4,231,640 11/1980 Funada et al. .................. 350/335 X
4,335,936 6/1982 Nonomura et al. ................. 350/335

FOREIGN PATENT DOCUMENTS 54-148548 11/1979 Japan ................................ 350/334

Primary Examiner—John K. Corbin
Assistant Examiner—Richard Gallivan
Attorney, Agent, or Firm—William E. Hiller; James T. Comfort; Melvin Sharp

[57] ABSTRACT

To avoid obtrusive interference colors in a liquid crystal device having birefringent substrates, the two substrates are selected to be of markedly unequal thicknesses.

7 Claims, 2 Drawing Figures

PLASTIC LIQUID CRYSTAL DEVICES WITH UNEQUAL SUBSTRATE THICKNESSES

BACKGROUND AND SUMMARY OF THE INVENTION

The present invention relates to liquid crystal devices.

A key criterion of a substrate material for plastic-substrate liquid crystal devices is physical and chemical stability. In many polymers, and particularly in polyester, physical and chemical stability is greatly enhanced by stretching the polymer. For example, polyester which has been stretched in two directions is marketed commercially as MYLAR TM, and is very widely used for applications, such as magnetic tape recording, which require great physical stability. Although it is highly desirable to be able to use the physical and chemical stability of stretched polymers, and in particular of stretched polyester, for liquid crystal devices, the stretching process unfortunately also induces birefringence. See F. D. Bloss, "An Introduction to the Methods of Optical Crystallography", Holt, Rinehart & Winston, New York 1961. In particular, two-dimensional stretching, as is done to make MYLAR, induces biaxial birefringence. In a twisted nematic liquid crystal device, such biaxial birefringence induces vivid color fringe effects, which are highly undesirable in a liquid crystal device.

In co-pending U.S. patent application Ser. No. 304,134, filed Sept. 21, 1981, abandoned in favor of continuation U.S. application Ser. No. 531,574 filed Sept. 12, 1983, the use of a polymer (preferably polyester), which has been stretched in one direction only, as a substrate for liquid crystal devices is claimed. Such one-dimensionally stretched polyester still has birefringence, but the birefringence in uniaxial rather than biaxial. Color fringing caused by uniaxial birefringent substrates is easier to avoid, and one-dimensionally stretched polyester still has greatly improved physical and chemical stability.

It is well known within the physics of birefringent films that the polarization of incident light can be transformed in the film, e.g. from linear to elliptical. The degree of transformation is determined by the product of the birefringence and the sample thickness divided by the wavelength of the light used. That is, for a given birefringent material, if a certain thickness will produce a null in transmission of incident red light, a slightly smaller thickness will produce a null in transmission of incident green light between crossed polarizers.

The problem in fabrication of liquid crystal devices having birefringent substrates is that obtrusive interference colors often appear in the finished device. One reason for these interference colors is that, when the upper and lower substrates have parallel principal axes, and a twisted nematic liquid crystal is between the two substrates, the optical retardation of the two substrates will approximately cancel. That is, while one substrate alone will typically induce an optical retardation of, e.g., 30 times pi, the difference in thickness in the two substrates is likely to be far smaller, and typically will correspond to optical retardation of only a few times pi at optical wavelengths if nominally equal substrate thicknesses are used. Typically the retardation is such that strong, saturated colors are produced at low angles to the substrate surface. The colors vary in hue with the thickness variations in the polymer substrates. This produces an unacceptable appearance to the display.

Thus, for a device with two birefringent substrates, the effective optical thickness will be small enough that low-order interference colors are produced, and these colors are exceedingly bright and noticeable. These colors are not noticed in a single film in isolation, because a single film, such as a seven mil thick piece of stretched polyester, is so thick that the interference nulls are a very high order, e.g. of order 30, and the interference colors produced by such higher-order nulls are not noticeable at all, since the many large-bandwidth nulls overlap.

This problem can be avoided by using isotropic rather than birefringent substrates, but use of birefringent substrates is preferable because of their chemical stability.

Thus it is an object of the present invention to provide a liquid crystal device using stretched polymer substrates which does not show apparent interference colors.

A further difficulty in the prior art of liquid crystal devices with birefringent substrates is that the interference colors seen are particularly sensitive to microscopic variations in the film thickness. That is, even a very good quality piece of optical plastic is very likely to have much random variation on a scale at least comparable to a wavelength of light, and such variation is itself sufficient to cause interference colors to appear.

Thus it is a further object of the invention to provide a liquid crystal device using birefringent substrates which does not require that optically flat substrates be used.

The present invention solves these problems very simply, by providing a device in which the two birefringent substrates have substantially unequal thicknesses. Thus, even when the thicknesses of the substrates are subtracted from each other, the net optical retardation is still large, and sufficient that the nulls induced are higher-order nulls.

According to the present invention there is provided: a liquid crystal device comprising: first and second substrates each comprising a birefringent material; first and second conductor layers, said conductor layers respectively being deposited on respective inner faces of said respective substrates; first and second alignment layers respectively deposited on said first and second conductor layers; perimeter seal means for sealing the perimeter of said first substrate to the perimeter of said second substrate; and a liquid crystal material filling the cavity defined between said respective inner surfaces of said respective substrates; wherein said first and second substrates have significantly unequal thicknesses.

BRIEF DESCRIPTION OF THE DRAWINGS

The present invention will be described with reference to the accompanying drawings in which.

DESCRIPTION OF THE PREFERRED EMBODIMENTS

Figure 1:
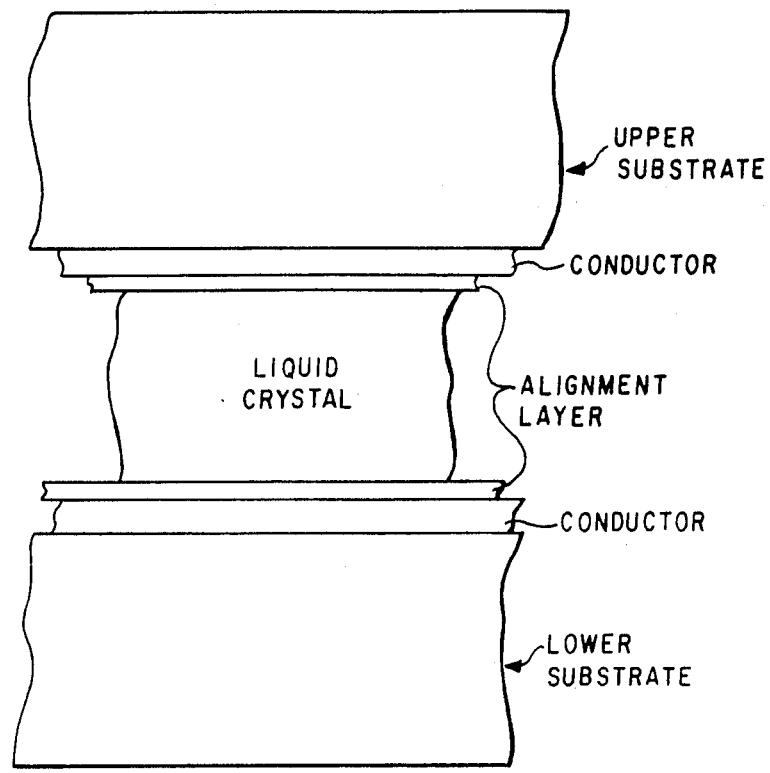
FIG. 1 shows a schematic sectional view of a liquid crystal device according to the prior art.
Figure 2:
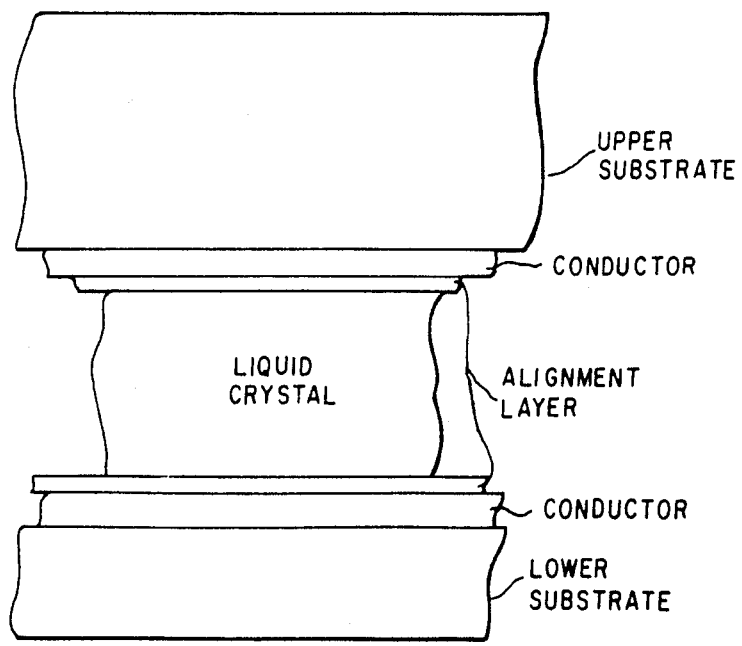
FIG. 2 shows a schematic sectional view of a liquid crystal device according to the present invention.

The present invention uses two birefringent substrates of unequal thickness to fabricate a liquid crystal device. Preferably the thicknesses of the two substrates differ by an amount which is greater than one mil. The absolute thickness of the substrates is not significant, but only the amount by which they differ. If the substrate thickness difference is at least 2 mils, the interference fringes will typically be of at least order 10, which is high enough to be substantially non-apparent.

Preferably the substrate material used is stretched polyester, as described in co-pending U.S. patent application Ser. No. 304,134, filed Sept. 21, 1981, abandoned in favor of continuation U.S. application Ser. No. 531,574 filed Sept. 12, 1983, which is hereby incorporated by reference. Such material has uniaxial birefringence, and the optic axis lies in the plane of the display.

Preferably, the substrate thicknesses used are four mils and seven mils. However, a wide variation of substrate thicknesses can be used, as long as they differ by at least 2 mils.

After the substrates have been provided, the remainder of the device fabrication process proceeds according to conventional steps. That is, the substrates are coated with a conductive layer, such as indium tin oxide, which can be patterned to form electrodes if a display device is required, or can simply be left unpatterned. An alignment layer, such as polyimide, is deposited on the metallization layer, and the alignment layer is then rubbed, so that it can induce a preferred alignment direction in the liquid crystal material.

The two substrates are then coated with glue around their perimeters, spacer elements (such as randomly distributed short fibers of fiberglass) are introduced between the substrates, and the two substrates are then glued together. A liquid crystal material is then injected into the cavity thus defined between the inner surfaces of the two substrates, and the fill hole, through which the liquid crystal material was injected, is sealed.

The interference fringes would not be a problem if the axes of the substrates were crossed, since in this case the optical rotations of the two substrates plus the liquid crystal material would not necessarily cancel to produce the low-order interference fringes which are a problem. However, the problem is that the thermal expansion coefficients of preferred substrate materials, such as stretched polyester, are also highly anisotropic, and are aligned with the optical axes, so that the device must be assembled with the substrate axes parallel, or the device will warp drastically is use.

The present invention is also not restricted to stretched polyester substrates, but can also be used in other devices having birefringent substrates, such as polyimide, uniaxial polycarbonate, etc.

Thus, the present invention provides the advantage that a highly passive and stable birefringent substrate material can be used for plastic liquid crystal devices, without a passivating overcoat being necessary.

It will be understood by those skilled in the art that the present invention can be practiced with a wide variety of modifications and variations, and accordingly the present invention is not limited except as specified in the following claims.

What is claimed is:

1. A liquid crystal device comprising:
   first and second substrates each comprising a birefringent material;
   first and second conductor layers, said conductor layers respectively being disposed on respective innerfaces of said respective substrates;
   first and second alignment layers respectively disposed on said first and second conductor layers;
   perimeter seal means interposed between said first and second substrates and sealing the perimeters thereof together to define a cavity between said first and second substrates with said first and second conductor layers and said first and second alignment layers being disposed in respective opposing relationship with respect to each other;
   a liquid crystal material filling the cavity defined between said first and second substrates; and
   the respective thicknesses of said first and second substrates being of unequal magnitudes of a degree sufficient to prevent the appearance of obtrusive interference colors.

2. The device of claim 1, wherein the respective thicknesses of said first and second substrates differ by more than 2 mils.

3. The device of claim 2, wherein both said substrates comprise a one-dimensionally-stretched polyester.

4. The device of claim 1, wherein said first and second substrates both consist of a uniaxial birefringent material.

5. The device of claim 4, wherein the respective optic axes of said substrates are mutually parallel.

6. The device of claim 4, wherein both said substrates comprise a one-dimensionally-stretched polymer.

7. The device of claim 1, wherein both said substrates comprise a one-dimensionally-stretched polyester.

* * * * *